US009166785B2

(12) United States Patent
Yasuda et al.

(10) Patent No.: US 9,166,785 B2
(45) Date of Patent: Oct. 20, 2015

(54) CRYPTOGRAPHY PROCESSING DEVICE AND CRYPTOGRAPHY PROCESSING METHOD

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 14/104,409

(22) Filed: Dec. 12, 2013

(65) Prior Publication Data

US 2014/0185797 A1    Jul. 3, 2014

(30) Foreign Application Priority Data

Dec. 27, 2012  (JP) ................. 2012-286259

(51) Int. Cl.
| | |
|---|---|
| *H04L 9/00* | (2006.01) |
| *H04L 9/08* | (2006.01) |
| *H04K 1/00* | (2006.01) |
| *H04L 9/28* | (2006.01) |

(52) U.S. Cl.
CPC .............. *H04L 9/0861* (2013.01); *H04L 9/008* (2013.01); *H04L 9/08* (2013.01)

(58) Field of Classification Search
CPC .......... H04L 9/0861; H04L 9/008; H04L 9/08
See application file for complete search history.

(56) References Cited

U.S. PATENT DOCUMENTS

| | | | |
|---|---|---|---|
| 7,065,210 B1 | 6/2006 | Tsujii et al. | |
| 7,184,551 B2 * | 2/2007 | Slavin | 380/44 |
| 8,681,973 B2 * | 3/2014 | Weinman | 380/28 |
| 2010/0246812 A1 * | 9/2010 | Rane et al. | 380/28 |
| 2011/0135096 A1 | 6/2011 | Rane et al. | |
| 2011/0176672 A1 | 7/2011 | Rane et al. | |
| 2011/0243320 A1 * | 10/2011 | Halevi et al. | 380/30 |
| 2012/0213359 A1 * | 8/2012 | Troncoso Pastoriza et al. | 380/28 |
| 2013/0318351 A1 * | 11/2013 | Hirano et al. | 713/168 |

FOREIGN PATENT DOCUMENTS

| | | |
|---|---|---|
| JP | 2000-216769 | 8/2000 |
| JP | 2011-118387 | 6/2011 |
| JP | 2011-145512 | 7/2011 |

OTHER PUBLICATIONS

Craig Gentry, "Fully Homomorphic Encryption Using Ideal Lattices", STOC 2009, ACM Press, pp. 169-178, May 31-Jun. 2, 2009.
Craig Gentry et al., "Implementing Gentry's Fully-Homomorphic Encryption Scheme", Lecture Notes in Computer Science vol. 6632, pp. 129-148 (pp. 1-30), Aug. 5, 2010.
(Continued)

*Primary Examiner* — Dede Zecher
*Assistant Examiner* — Trang Doan
(74) *Attorney, Agent, or Firm* — Fujitsu Patent Center

(57) ABSTRACT

A device that uses homomorphic encryption is disclosed. The device includes a public key data generator configured to generate public key data, and a secret key data generator configured to generate secret key data that includes, as a secret key, an integer that is an element of a matrix obtained as a product of the first public key matrix element and an inverse matrix of the secret key matrix and that is not a multiple of the plain text space size.

12 Claims, 6 Drawing Sheets

(56) References Cited

OTHER PUBLICATIONS

Masaya Yasuda et al., "Secret totalization of purchase histories of companies in cloud", The 29th Symposium on Cryptography and Information Security, Jan. 30-Feb. 2, 2012. English translation of outline and table 4.

EESR—Extended European Search Report dated Mar. 27, 2014 issued in corresponding European Patent Application No. 13197685.4.

Yasuda Masaya et al, "Analysis of Lattice Reduction Attack against the Somewhat Homomorphic Encryption Based on Ideal Lattices", The Semantic Web—ISWC 2004; [Lecture Notes in Computer Science], Sep. 13, 2012, pp. 1-16, Heidelberg, Berlin.

Craig Gentry et al, "Implementing Gentry's Fully-Homomorphic Encryption Scheme", Feb. 4, 2011, pp. 1-29, Retrieved from the Internet: URL: http://researcher.watson.ibm.com/researcher/files/us-shaih/fhe-implementation.pdf.

Yasuda Masaya et al, "Packed Homomorphic Encryption based on Ideal Lattices and Its Application to Biometrics", The Semantic Web—ISWC 2004; [Lecture Notes in Computer Science], Sep. 2, 2013, pp. 55-74, Heidelberg, Berlin.

\* cited by examiner

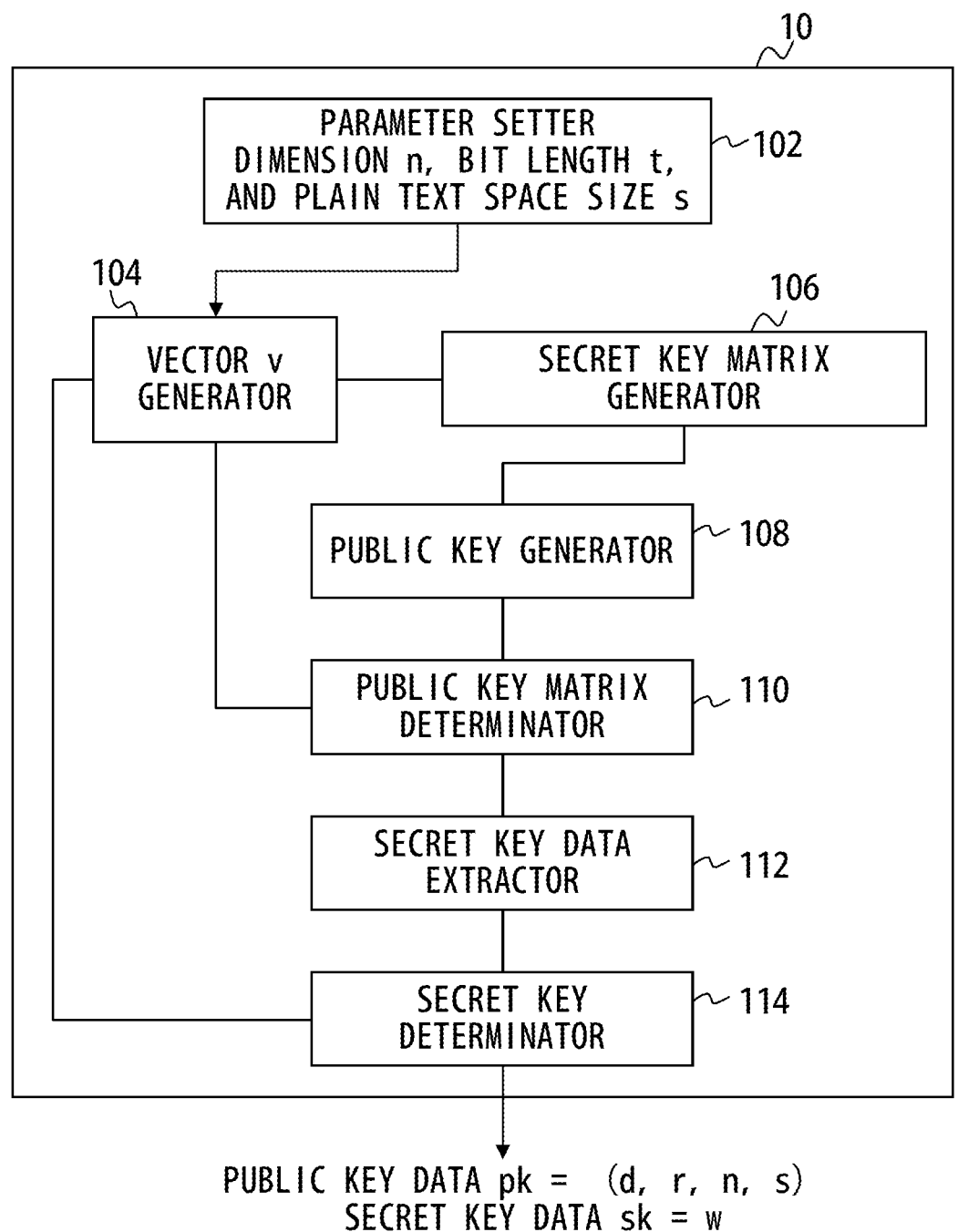
F I G. 1

CRYPTOGRAPHY PROCESSING DEVICE AND CRYPTOGRAPHY PROCESSING METHOD

CROSS-REFERENCE TO RELATED APPLICATION

This application is based upon and claims the benefit of priority of the prior Japanese Patent Application No. 2012-286259, filed on Dec. 27, 2012, the entire contents of which are incorporated herein by reference.

FIELD

The embodiments discussed herein are related to a cryptography processing device and a cryptography processing method.

BACKGROUND

Today, the protection of personal information and confidential information has been becoming more and more important, and the market of services that use personal information or confidential information has been expanding. Examples of such services include a service that utilizes position information of an individual user that can be obtained from a smart phone, etc. This has generated attention for information concealing techniques, which enable the utilization of personal information/confidential information while keeping such information in a protected state. Examples of information concealing techniques include a technique that uses a cryptography technique or a statistics technique in accordance with data type or service requirements.

As a concealing technique that uses cryptography, a homomorphic encryption technique is known. A homomorphic encryption technique is one public key encryption method that uses a pair of different keys for encryption and decryption, and has a function of permitting data manipulation while keeping the data in an encrypted state.

By using a homomorphic encryption method, when addition or multiplication is performed on an encrypted text, it is possible to obtain an encrypted text, which is a computation result after performing addition or multiplication, without decrypting an encrypted text. This feature of a homomorphic encryption method is considered to be utilized in the field of electronic voting/electronic cash and recently in the cloud computing field. As homomorphic encryption methods related to addition or multiplication, an RSA encryption method, which only permits multiplication, and an Additive ElGamal encryption, which only permits addition, are known. In a multiplication homomorphic encryption method, when encrypted texts of plain texts (messages) a and b are E(a) and E(b), encrypted text E(a·b) of the product of plain texts a·b can be calculated from E(a) and E(b). Also, in an addition homomorphic encryption method, when encrypted texts of plain texts a and b are E(a) and E(b), the encrypted text E(a+b) of the sum of the plain texts a+b can be calculated from E(a) and E(b). By using a homomorphic encryption method to perform addition or multiplication on encrypted texts, it is possible to obtain an encrypted text as a computation result of performing addition or multiplication without decrypting an encrypted text. This feature of a homomorphic encryption method is expected to be utilized in the field of electronic voting/electronic cash and recently in the cloud computing field.

In recent years, as an encryption method having homomorphy for both addition and multiplication, a fully homomorphic encryption method is known. When addition and multiplication are possible while keeping targets in an encrypted state, operations such as exclusive OR, AND, and NOT are possible while keeping targets in an encrypted state. In other words, a fully homomorphic encryption method has homomorphy for all operations performed by logical circuits. Although, at first, only a theoretical implementation method was introduced and practical configurations were not made public, examples of specific configurations of generating a key and a cryptography method that expanded types of data that can be encrypted have also been proposed. In these examples of specific configurations of generating a key, keys such as a public key and a secret key are in the form of matrix.

A homomorphic encryption method can be used in a system that checks the similarity between two pieces of information.

Patent Document 1: Japanese Laid-open Patent Publication No. 2011-145512

Non-Patent Document 1: C. Gentry, "Fully Homomorphic encryption using ideal lattices", STOC 2009, pp. 169-178, 2009

Non-Patent Document 2: C. Gentry and S. Halevi, "Implementing Gentry's Fully Homomorphic Encryption Scheme", EUROCRYPT 2011, LNCS 6632, pp. 129-148, 2011

Non-Patent Document 3: Yasuda, Yajima, Shimoyama, and Kogure, "Secret totalization of purchase histories of companies in cloud" SCIS 2012

SUMMARY

A cryptography processing device is disclosed. The cryptography processing device includes a processor configured to generate a prescribed dimension of vector as a key generation vector in which each element is equal to or smaller than a maximum bit length and elements except for a first element are integers that are multiples of a plain text space size, which is a number of types of symbols that the plain text to be encrypted may take, generate a secret key matrix from the key generation vector, generate a public key matrix from the secret key matrix and to generate public key data including a first public key matrix element, which is a discriminant of the public key matrix, a second public key matrix element, which is an integer, the dimension, and the plain text space size, and generate secret key data that includes, as a secret key, an integer that is an element of a matrix obtained as a product of the first public key matrix element and an inverse matrix of the secret key matrix and that is not a multiple of the plain text space size.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram illustrating an example of a function of a key generator;

DESCRIPTION OF EMBODIMENTS

Figure 2:
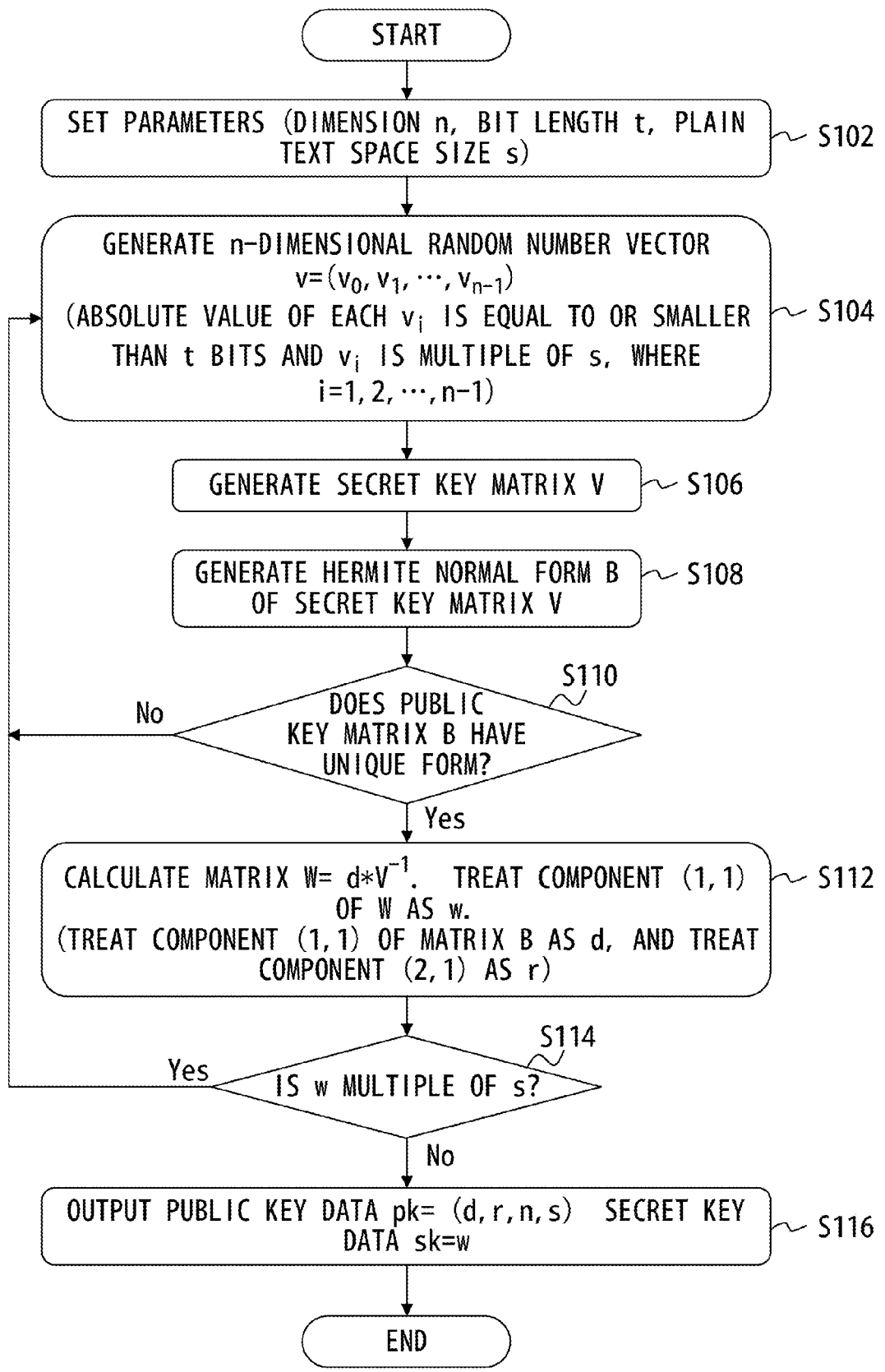
FIG. 2 is a flowchart illustrating an example of a flow of a process of a key generation method according to the present disclosure.

Hereinbelow, explanations will be given for a homomorphic encryption process method that can calculate a concealment distance such as a Hamming distance while keeping the distance in an encrypted state. Hereinafter, an example of ideal lattice-based fully homomorphic encryption is explained as fully homomorphic encryption.

In a cryptography processing device that uses homomorphic encryption, a concealment distance is sometimes calculated between two vectors $a=(a_1, a_2, \ldots)$ and $b=(b_1, b_2, \ldots)$. Usually, when vector data $a=(a_1, a_2, \ldots)$ is to be encrypted by homomorphic encryption, each component $a_i$ is encrypted so as to generate encrypted vector data $Enc(A)=(Enc(a_1), Enc(a_2), \ldots)$. For vector data $Enc(B)=(b_1, b_2, \ldots)$ too, each component $b_i$ is encrypted so as to calculate an encrypted concealment distance between encrypted vector data $Enc(B)=(Enc(b_1), Enc(b_2), \ldots)$, e.g., an encrypted Hamming distance as represented below.

$$\sum_i (Enc(a_i) - Enc(b_i))^2$$

In order to obtain a Hamming distance, an encrypted concealment distance such as an encrypted Hamming distance is calculated. However, when an encrypted concealment distance is to be decrypted, there are no encryption/decryption methods that yield a high accuracy and high processing speed, and this sometimes leads to inaccurate decryption results, which is problematic.

When keys such as a public key, a secret key, and the like are in the form of matrix in homomorphic encryption, calculations for these matrixes require a device having a memory volume that is sufficiently large to perform matrix calculations, which is problematic. Also, in such a homomorphic encryption, calculations related to keys include matrix operations, leading to a longer calculation time, which is problematic.

<Fully Homomorphic Encryption Process Method>

First, explanations will be given for a homomorphic encryption method. Somewhat homomorphic encryption is a cryptography method that can perform both addition and multiplication a limited number of times. This cryptography method requires an encryption size and processing performance that are much smaller and lower than those required by fully homomorphic encryption, and is expected to be used for more practical purposes. Somewhat homomorphic encryption explained hereinbelow is also referred to as ideal lattice-based homomorphic encryption. This name is based on the fact that additional homomorphism and multiplicative homomorphism are introduced by using an ideal lattice.

Somewhat homomorphic encryption is cryptography that satisfies homomorphy for computations by all logic circuits.

As examples of homomorphy, there is homomorphy in addition and homomorphy in multiplication. Homomorphy in addition and homomorphy in multiplication represent, for example, the fact that a mapping (function) F satisfies the below (1) or (2) for arguments $m_1$ and $m_2$. That is, the equation below is satisfied.

$$F(m_1)+F(m_2)=F(m_1+m_2) \quad (1)$$

$$F(m_1) \times F(m_2)=F(m_1 \times m_2) \quad (2)$$

The case of (1) represents homomorphy in addition, and the case of (2) represents homomorphy in multiplication. When the above arguments $m_1$ and $m_2$ as plain texts and encryption function Enc as mapping F are assigned, the result is homomorphic encryption. The calculation for obtaining encrypted texts $Enc(m_1)$ and $Enc(m_2)$ from plain texts $m_1$ and $m_2$ are also referred to as "encryption".

According to a somewhat homomorphic encryption, the existence and execution of mapping F that satisfies the following equation is guaranteed when an encryption function that performs encryption by using a key pair (pk, sk) and the public key pk of plain texts $m_1, m_2, \ldots, m_n$ is Enc and a decryption function that performs decryption by using a secret key sk is Dec.

$$Dec(F(Enc(m_1), Enc(m_2) \ldots, Enc(m_n)))= F(m_1, m_2, \ldots, m_n) \quad (3)$$

A somewhat homomorphic encryption is a public key encryption. Here, F is a mapping, however, it may be an algorithm. Furthermore, the mapping F is assumed that it is able to be expressed by combinations of addition and multiplication.

The above equation 3 has the following meanings. The process on the left side is referred to as process A, and the process on the right side is referred to as process B. For simplicity, plain text $m_1$ is considered. In the step of encrypting process A, plain text $m_1$ is encrypted by using a public key pk so as to obtain encryption data $c=Enc(m_1)$. Then, for this encryption data c, a process of performing prescribed mapping (algorithm) F by using public key pk is executed so as to obtain process result r. Next, in a decryption step, a process of decrypting process result r is executed by using secret key sk so as to generate decryption result $R=Dec(F(Enc(m_1)))$.

In process B, for plain text $m_1$, a process of performing prescribed mapping (algorithm) F is executed so as to obtain process result $r'=F(m_1)$.

The above equation means that the result $r=Dec(F(Enc(m_1)))$ of process A and the result $R'=F(m_1)$ of process B are equal.

Further, for plain texts $m_1, m_2, \ldots, m_n$, homomorphy means the equation below.

$$F(Enc(m_1), Enc(m_2), \ldots, Enc(m_n))= Enc(F(m_1, m_2, \ldots, m_n)) \quad (4)$$

Here, in the right side of the above equation, attention is to be paid to the fact that there is only one argument of encryption function Enc., i.e., $F(m_1, m_2, \ldots, m_n)$.

Methods of generating keys include the following examples.

When a key is generated, two parameters, i.e., dimension n and maximum bit length t, are needed. An n-dimensional key generation vector $V=(v_0, v_1, \ldots, v_{n-1})$ that has absolute values of the respective components equal to or smaller than t bits for dimension n and maximum bit length t is generated. The secret key is then expressed by the matrix below.

$$V = \begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix} \quad (5)$$

Also, matrix B, which is the Hermite normal form of the above matrix V, is assumed to be a public key. The Hermite normal form is a lower triangular matrix or an upper triangular matrix that can be obtained by performing fundamental row operation on integers in an integer matrix. It is a known general rule that the Hermite normal form can be calculated efficiently, and by using matrix B, which is the Hermite normal form of the above matrix V, calculation time can be reduced.

Encryption will be explained. When encryption is performed on one-bit plain text b by using public key B, n-dimensional key generation vector $u=(u_0, u_1, \ldots, u_{n-1})$ having components of 0 or 1 is first selected so that $e1=(1, 0, \ldots, 0)$ is satisfied, and vector a is generated as below:

$$a = 2u + b \times e_1 = (2u_0 + b, 2u_1, \ldots, 2u_{n-1}) \quad (6)$$

Vector a thus obtained is also referred to as a fresh encrypted text.

Encrypted text c of one-bit plain text b is generated as expressed by the equation below.

$$c = a \bmod B = a - \lceil a \times B^{-1} \rceil \times B \quad (7)$$

Here, it is assumed that $B^{-1}$ is an inverse matrix of matrix B, and that "q" is a function that gives an integer value closest to rational number q.

For the decryption of encrypted text c of one-bit plain text, n-dimensional vector a' defined by the equation below is first calculated.

$$a' = c \bmod V = c - \lceil c \times V^{-1} \rceil \times V \quad (8)$$

Next, first component $a_0'$ of n-dimensional vector a' is extracted, and the remainder of dividing $a_0'$ by 2 becomes the value obtained by decrypting encrypted text c.

Also, as other decryption methods, the methods below are known. It is assumed that the first component of encrypted text a is c. It is also assumed that w is an element of inverse matrix $V^{-1}$ of secret key V, and is an odd number. Further, it is assumed that the range of value in the equation below is $(-d/2, d/2)$.

$$[x]_d = x \bmod d \quad (9)$$

In equation 9, d represents a discriminant of public key B. Encrypted text c is defined by the equation below.

$$c = [c \times w]_d \bmod 2 \quad (10)$$

It is known that this method can increase the processing speed in comparison with methods that use equation (7) or equation (8).

Explanations will be given for examples of values of the above key generation, encryption, and decryption. Examples when maximum bit length t is seven and dimension n is four are explained. First, four-dimensional key generation vector $v=(112, 99, -125, 77)$ whose absolute value is an integer that is equal to or smaller than seven bits and is a multiple of plain text space size s is selected. At that moment, matrix V has a secret key represented by the equation below.

$$V = \begin{bmatrix} 112 & 99 & -125 & 81 \\ -81 & 112 & 99 & -125 \\ 125 & -81 & 112 & 99 \\ -99 & 125 & -81 & 112 \end{bmatrix} \quad (11)$$

Next, the Hermite normal form B of secret key V is calculated as:

$$B = \begin{bmatrix} 1143821449 & 0 & 0 & 0 \\ 982623548 & 1 & 0 & 0 \\ 480851699 & 0 & 1 & 0 \\ 190648369 & 0 & 0 & 1 \end{bmatrix} \quad (12)$$

and this matrix B is treated as a public key.

A case is considered where plain text b=1 is encrypted by using public key B. First, four-dimensional key generation vector $u=(1, 0, 1, 1)$ having components of 0 or 1 is selected. Next, fresh encrypted text a is calculated. In the present case, the equation below is used.

$$a = 2u + b \times e_1 = (3, 0, 2, 2) \quad (13)$$

Then, encrypted text c of plain text b=1 is expressed by $$c = a \bmod B = a - \lceil a \times B^{-1} \rceil \times B = (-199178684, 0, 0, 0). \quad (14)$$

However, $a \times B^{-1} = (-1343000133/1143821449, 0, 2, 2)$ and "$a \times B^{-1}$" $= (-1, 0, 2, 2)$ are satisfied. As a consequence, it is understood that encrypted text $c = -199178684$ is satisfied.

When encrypted text c is decrypted by using secret key V, four-dimensional vector a' defined by equation 8 is first calculated. In this case, four-dimensional vector $a'=(3, 0, 2, 2)$ is satisfied. The remainder obtained by dividing the first component of four-dimensional vector a' by two is 3=2+1, and accordingly encrypted text c=1 is satisfied, meaning that the decryption has been performed without failure. In the above homomorphic encryption method, four-dimensional vector a and four-dimensional vector a' are identical.

In the above, a case where plain text b is of one bit has been explained; however, the domain of a plain text may be expanded. Even when plain text b is selected from $\{0, 1, \ldots, s-1\}$ i.e., even when the plain text space size is s, encryption and decryption are possible by using the same methods as above.

When plain text b equal to or smaller than plain text space size s is to be encrypted by using public key B, public key matrix B defined as the Hermite normal form of secret key matrix V is generated, and public key matrix B for this case is assumed to be in the form of $$B = \begin{bmatrix} d & 0 & 0 & \cdots & 0 \\ r & 1 & 0 & \cdots & 0 \\ * & 0 & 1 & \cdots & 0 \\ \vdots & \vdots & \vdots & \ddots & \vdots \\ * & 0 & 0 & \cdots & 1 \end{bmatrix}. \quad (15)$$

Further, when components (1,1) and (2,1) of public key matrix B are assumed to be d and r, respectively, component (1,1) of matrix W defined by equation 16 below $$W = d \times V^{-1} \quad (16)$$

is not a multiple of s. In other words, w adopts, as secret key data, a w that satisfies the equation below where k is an integer.

$$w \neq s \times k \quad (17)$$

As public key data it is sufficient to hold the four elements of (d, r, n, s). Also, by holding secret key w and inverse number $w^{-1}$ of a secret key in the encryption device, the necessity of obtaining these values each time of decryption is eliminated. Also, it is not necessary to hold secret key matrix V, making it possible to reduce the size of a secret key.

In order to encrypt plain text b by using a public key and a secret key as described above, an n-dimensional key generation vector $u=(u_0, u_1, \ldots, u_{n-1})$ having components of 0 or 1 is first selected so as to generate vector a as represented by the equation below, where b is a plain text.

$$a = su + b \times e_1 = (su_0 + b, su_1, \ldots, su_{n-1}) \tag{18}$$

Similarly to the above, $e_1 = (1, 0, \ldots, 0)$. Also this vector a may sometimes be referred to as a fresh encrypted text. Encrypted text c of plain text b is given by the equation below, similarly to equation (7) above.

$$c = a \bmod B = a - \lceil a \times B^{-1} \rceil \times B \tag{19}$$

Because vector $c=(c, 0, \ldots, 0)$ is satisfied, encrypted text c is an integer.

In the decryption of encrypted text c of plain text b, n-dimensional vector a' that is defined by the equation below is calculated first.

$$a' = c \bmod V = c - \lceil c \times V^{-1} \rceil \times V \tag{20}$$

Next, first component $a_0'$ of n-dimensional vector a' is extracted, and the remainder of dividing $a_0'$ by plain text space size s becomes the value obtained by decrypting encrypted text c. In this decryption process, a process of multiplying vector c by matrix $V^{-1}$ and a process of multiplying the vector obtained by the multiplication by matrix V are performed. In other words, multiplication between a vector and a matrix is performed twice. The number of times of performing multiplication for this case is in proportion to the number of elements D of the vector, and is $2 \times D^2$. Also, when data to be treated is large, one time of multiplication is multiple-precision multiplication.

Also, as a method of decrypting encrypted text c of plain text b whose plain text space size is s, a method as below is known.

Matrix W having matrix elements $w_{i,j}$ is defined as the equation below.

$$W = d \times V^{-1} \tag{21}$$

However, element $w_{ij}$ whose greatest common divisor gcd satisfies equation (22) is found and is treated as w.

$$\gcd(s, w_{i,j}) = 1 \tag{22}$$

Then, when equation (23) is satisfied where the first component of vector c is c, b' is a value resulting from decrypting encrypted text c.

$$b' = \lceil c \times w \rceil_d \bmod s \tag{23}$$

Examples of values of key generation will be explained. It is assumed that dimension n is four, maximum bit length t is seven, and plain text space size s is thirteen. First, the four-dimensional vector is set to $(v_1, v_2, v_3, v_4)$, and a four-dimensional vector $v=(93, -112, 96, -116)$ in which the absolute value of each component $v_i (i=1, 2, 3, 4)$ is equal to or smaller than $t=7$ bits and components except for first component $v_1$, i.e., components $v_2$, $v_3$, and $v_4$, are multiples of $s=13$ is selected. In such a case, secret key V is as expressed by the equation below.

$$V = \begin{bmatrix} 93 & -112 & 96 & -116 \\ 116 & 93 & -112 & 96 \\ -96 & 116 & 93 & -112 \\ 112 & -96 & 116 & 93 \end{bmatrix} \tag{24}$$

Next, the Hermite normal form of secret key V is calculated as $$B = \begin{bmatrix} 998261713 & 0 & 0 & 0 \\ 237533531 & 1 & 0 & 0 \\ 925445203 & 0 & 1 & 0 \\ 132074857 & 0 & 0 & 1 \end{bmatrix}, \tag{25}$$

and this matrix B is treated as a public key. B described above has a unique form, and accordingly it is assumed that components (1,1) and (2,1) of matrix B are d=998261713 and r=237533531.

Next, $W = d \times V^{-1}$ defined by equation (26) is calculated.

$$W = \begin{bmatrix} 4165509 & 5023792 & 694608 & 846356 \\ -846356 & 4165509 & 5023792 & 694608 \\ -694608 & -846356 & 4165509 & 5023792 \\ -5023792 & -694608 & -846356 & 4165509 \end{bmatrix} \tag{26}$$

Because w=4165509 is not a multiple of plain text space size s=4, component (1,1) of matrix W is output as public key data and secret key data for pk=(d, r, n, s) and sk=w, respectively.

Also, addition and multiplication of encryption data are explained. Similarly to the above value examples, an encrypted text can always be expressed as n-dimensional vector $c=(c_1, 0, \ldots)$, whose components except for the first component are zero. Integers of the first component of an encrypted text can be calculated as equation 27 by using plain text b, plain text space size s, and n-dimensional vector $u=(u_0, u_1, \ldots, u_{n-1})$ that is used for encryption.

$$c_1 = \left[ b + s \sum_{i=0}^{n-1} u_i \times r^i \right]_d. \tag{27}$$

However, $[x]_d$ is $$[x]_d = x \bmod d \tag{28}$$

and is an integer whose range of value is (−d/2, d/2), d is component (1,1) of matrix B representing a public key, and r is component (2,1) of matrix B representing a public key.

For two encrypted texts $c_1$ and $c_2$, encryption addition and encryption multiplication are defined as $[c_1 + c_2]_d$ and $[c_1 \times c_2]_d$, respectively.

In order to apply the above characteristics of homomorphic encryption to comparison between two pieces of vector data, processes for example as below are performed.

It is assumed that there is vector data $A=(a_1, a_2, \ldots, a_n)$ and vector data $B=(b_1, b_2, \ldots, b_n)$. It is herein assumed that vector data A and vector data B are written as n-dimensional vector quantities.

As a conversion polynomial, equation 29 is calculated for vector data $A=(a_1, a_2, \ldots, a_n)$.

$$a(x) = \sum_{i=1}^{n} a_i x^{i-1} \quad (29)$$

Then, by encrypting conversion polynomial a(x), encryption data Enc(a(x)) is calculated. In this case, it is assumed to be the equation below.

$$Enc(a(x)) = \left[ a(r) + s \times \sum_{i=0}^{n-1} u_i \times r^{i-1} \right]_d \quad (30)$$

Equation (31) is calculated as a conversion polynomial for vector data $B = (b_1, b_2, \ldots, b_n)$.

$$b(x) = \sum_{j=1}^{n} b_j x^{n-j+1} \quad (31)$$

Then, by encrypting conversion polynomial b(x), encryption data Enc(b(x)) is calculated. Encryption Enc(b(x)) is a result of replacing a(x) with b(x) in equation (30). Also, a conversion polynomial for vector data $B = (b_1, b_2, \ldots, b_n)$ is different from that for vector data $A = (a_1, a_2, \ldots, a_n)$.

Then, instead of comparing vector data $A = (a_1, a_2, \ldots, a_n)$ and vector data $B = (b_1, b_2, \ldots, b_n)$, comparison is made by performing multiplication and/or addition by using encryption data Enc(a(x)) and encryption data Enc(b(x)). By decrypting the result of comparison, a result of comparing vector data $A = (a_1, a_2, \ldots, a_n)$ and vector data $B = (b_1, b_2, \ldots, b_n)$ can be obtained.

<Concealment Distance Calculation Using Homomorphic Encryption>

Next, in order to perform a concealment distance calculation, two integers $C_1$ and $C_2$ are prepared beforehand. Integer $C_1$ is defined by the equation below.

$$C_1 = \left[ -\sum_{i=1}^{n} r^{n-i+1} \right]_d \quad (32)$$

Also, integer $C_2$ is defined by the equation below.

$$C_2 = \left[ -\sum_{j=1}^{n} r^{j-1} \right]_d \quad (33)$$

In that case, concealment distance d is as below.

$$d = C_1 \times Enc(a(x)) + C_2 \times Enc(b(x)) + 2Enc(a(x)) \times Enc(b(x)) \quad (34)$$

In equation (34), $C_1 \times Enc(a(x))$ and $C_2 \times Enc(b(x))$ correspond to Hamming weights HW(a) and HW(b) of encrypted text, respectively. When concealment distance d above is decrypted, the Hamming distance of two pieces of vector data $A = (a_1, a_2, \ldots, a_n)$ and $B = (b_1, b_2, \ldots, b_n)$ are obtained.

Although equations (31) and (33) were used in the above, it is also possible to replace b(x) and $C_2$ with b'(x) and $C_2'$, as in the equation below $$b'(x) = -\sum_{j=1}^{n} b_j x^{n-j+1} \quad (35)$$

$$C_2' = -\left[ \sum_{j=1}^{n} r^{j-1} \right]_d$$

so as to define concealment distance d as represented by the equation below.

$$d = C_1 \times Enc(a(x)) + C_2' \times Enc(b'(x)) - 2Enc(a(x)) \times Enc(b'(x)) \quad (36)$$

Attention should be paid to the fact that the sign of the third term of the right side of equation 36 is different from that in equation (34). Equation (36) may also be calculated as below.

$$d = C_2(-Enc(a(x)) + Enc(b'(x))) + 2Enc(a(x)) \times (1 - Enc(b'(x))) \quad (37)$$

As described above, the method according to the disclosure has the following characteristics.
(1) Lattice-based homomorphic encryption is used.
(2) A vector representing a characteristic quantity is converted into a polynomial by using a conversion polynomial.
(3) Encrypted texts of conversion polynomials and encrypted texts of weights such as the Hamming weight of vector are used.
(4) For concealment distance calculations, homomorphy of homomorphic encryption is used.
(5) It is sufficient to hold public key d, element (2,1) r of the public key matrix, dimension n, and plain text space size s as public key data, and to hold secret key w as secret key data.

As described above, by using homomorphic encryption for calculations of concealment distance such as a Hamming distance, a great reduction in the encryption data size and calculation time is possible. Further, a scalar value instead of a matrix value can be used as a public key and a secret key, and accordingly it is possible to reduce the scale of a device for implementing the above method and to execute processes at a high speed because computation is performed for scalar values.

Also, in the above method, only four scalar quantities are treated as public keys and only one scalar quantity is treated as a secret key, and accordingly errors are not involved in calculations, making correct decryption possible.

The above encryption and decryption based on ideal lattice-based homomorphic encryption can also be explained as below.

First, the wording is defined in brief.

A lattice is a discrete additional subgroup in $Z^n$ where Z is an integer ring. When $b_0, \ldots, b_{n-1}$ are linearly independent in $Z^n$, square matrix $B = [b_0, \ldots, b_{n-1}]$, which is obtained by arranging these elements, is referred to as a basis. Lattice L can be represented as $$L = \sum_{i=0}^{n-1} v_i \cdot b_i, \quad (38)$$

where v is an element of $Z^n$.

The fact that lattice L is an ideal lattice means that ideal I of ring $R = Z[x]/f(x)$, which is isomorphic to lattice L, exists. In this example, Z[x] is an integer coefficient polynomial ring and f(x) is an n-dimensional polynomial that is integer coefficient monic.

The member of the principal ideal generated by equation 39, which is one member of a factor ring, can be written by a linear combination of a, a·x, a·x$^2$, a·x$^{n-1}$. The transposition of a is written as a$^T$.

$$a = a_0 + a_1 \cdot x + a_2 \cdot x^2 + \ldots + a_{n-1} \cdot x^{n-1} \bmod f(x) \quad (39)$$

A monic polynomial with integer coefficient $a(x) = a_0 + a_1 x + \ldots + a_{n-1} x^{n-1}$ of ring $R = Z[x]/(x^n+1)$ is discussed for $f(x) = x^n + 1$. In order to treat vector $a = (a_1, a_2, \ldots, a_{n-1})$ and ring $R = Z[x]/(x^n+1)$ as identical values, the following process is performed. A rotation matrix is defined for a.

$$Rot(a) = \begin{bmatrix} a_0 & a_1 & a_2 & \ldots & a_{n-1} \\ -a_{n-1} & a_0 & a_1 & \ldots & a_{n-2} \\ -a_{n-2} & -a_{n-1} & a_0 & \ldots & a_{n-3} \\ \vdots & \vdots & \vdots & \ddots & \vdots \\ -a_1 & -a_2 & -a_3 & \ldots & a_0 \end{bmatrix} \quad (40)$$

This is identical to the above equation (5). Then, it is possible to define a product for two polynomials a(x) and b(x) by using a(x)·b(x)=Rot(a)·b. Also, rotation matrix Rot(a) becomes a basis matrix.

According to the above, key generation in the above lattice-based homomorphic encryption method is as follows. Specifically, a discriminant d for ideal I of ring $R = Z[x]/(x^n+1)$ and basis matrix V of ideal J that is prime to ideal I are treated as public keys, and $d \times V^{-1}$ is treated as secret key w. For example, matrix V may be $n^{1/2}I + R$ where R represents a matrix that is random and is a matrix having a small norm.

Then, in encryption, r is selected from R so that it is the first component of c=b+rs mod B for encrypted text c of plain text b. When the norm of plain text b is small, decryption is possible by $b = [c \times w]_d \bmod s$. Attention should be paid to the fact that $[c \times w]_d$ is calculation between scalar values. This can increase the speed of calculation.

By calculating a concealment distance such as a Hamming distance by using the above lattice-based fully homomorphic encryption, it is possible to reduce both the size of cryptography data and the time for concealment distance calculations and also to increase the speed of calculation.

<Structure of Key Generator>

FIG. 1 is a block diagram illustrating a function of an example of a device that performs key generation in homomorphic encryption as described above. The device illustrated in FIG. 1 outputs public key data pk (for example, group (d, r, n, s)) and secret key data sk (for example, scalar quantity w) on the basis of input parameters (for example, dimension n, maximum bit length t, and plain text space size s). This device may constitute a key generator of a cryptography processing device using a public key method.

As illustrated in FIG. 1, a key generator 10 includes a parameter setter 102, a vector v generator 104, a secret key matrix generator 106, a public key generator 108, a public key matrix determinator 110, a secret key data extractor 112, and a secret key determinator 114. The vector v generator 104 may also be referred to as the vector generator 104 simply.

Also, the public key generator 108 and the public key matrix determinator 110 are combined so as to constitute the public key data generator. The secret key data extractor 112 and the secret key determinator 114 are combined to constitute the secret key data generator.

In the parameter setter 102, dimension n, maximum bit length t, and plain text space size s are set. These pieces of data may be input from the external environment for each key generation or may be selected through the parameter setter 102.

The vector v generator 104 generates key generation vector $V = (v_0, v_1, \ldots, v_{n-1})$. Key generation vector $V = (v_0, v_1, \ldots, v_{n-1})$ is an n-dimensional vector in which the absolute value of each component is equal to or smaller than t bits and components $v_1, \ldots, v_{n-1}$ except for $v_0$ are an integer multiple of plain text space size s.

The secret key matrix generator 106 uses a component of vector v generated by the vector v generator 104, and generates secret key matrix V as represented by the equation below.

$$V = \begin{bmatrix} v_0 & v_1 & v_2 & \ldots & v_{n-1} \\ -v_{n-1} & v_0 & v_1 & \ldots & v_{n-2} \\ -v_{n-2} & -v_{n-1} & v_0 & \ldots & v_{n-3} \\ \vdots & \vdots & \vdots & \ddots & \vdots \\ -v_1 & -v_2 & -v_3 & \ldots & v_0 \end{bmatrix} \quad (41)$$

The public key generator 108 generates, as a public key matrix, matrix B that is the Hermite normal form of matrix V.

The public key matrix determinator 110 determines whether or not public key matrix B generated by the public key generator 108 has the form as represented by equation (42) where component (1,1) is d and component (2,1) is r.

$$B = \begin{bmatrix} d & 0 & 0 & \ldots & 0 \\ r & 1 & 0 & \ldots & 0 \\ * & 0 & 1 & \ldots & 0 \\ \vdots & \vdots & \vdots & \ddots & \vdots \\ * & 0 & 0 & \ldots & 1 \end{bmatrix} \quad (42)$$

When public key matrix B does not have the form as represented by equation 42, such a matrix is discarded, and the key generation is performed again. When public key matrix B has the form as represented by equation 42, such a matrix B remains without being discarded. Component (1,1)d and component (2,1)r are both scalar values. Scalar value d, which is component (1,1) of public key matrix B, is also referred to as a public key.

The secret key data extractor 112 extracts scalar value w, which is component (1,1) of matrix W defined by equation 43 below when component (1,1) and component (2,1) of public key matrix B are d and r, respectively.

$$W = d \times V^{-1} \quad (43)$$

Component (1,1) d of public key matrix B is also a determinant of matrix B.

The secret key determinator 114 determines whether or not scalar value w extracted from the secret key data extractor 112 is a multiple of s. When scalar value w is a multiple of s, such a w is discarded and key generation is performed again. When scalar value w is not a multiple of s, such a matrix B remains without being discarded. Scalar value w is also referred to as a secret key.

As a consequence, the key generator 10 outputs public key d, element (2, 1)r of a public key matrix, dimension n, and plain text space size s as public key data, and also outputs secret key w as secret key data.

<Process Performed by Key Generator>

By referring to FIG. 2, an example of a flow of a process executed by the key generator 10 illustrated in FIG. 1 will be explained.

When the process has started, parameters are set in step S102 first. Parameters herein include dimension s, maximum bit length t, and plain text space size s. The processes in this step may be executed by the parameter setter 102 of the key generator 10.

In the next step, S104, n-dimensional key generation vector $v=(v_0, v_1, \ldots, v_{n-1})$ in which each element is equal to or smaller than the maximum bit length and elements except for the first element are integers that are multiples of the plain text space size, which is the number of types of symbols that the plain text to be encrypted may take, is generated. The process of this step may be executed by the vector v generator 104 of the key generator 10.

In S106, secret key matrix V is generated as represented by equation 41 by using components of vector v generated by the vector v generator 104. The process in this step may be executed by the secret key matrix generator 106 of the key generator 10.

In S108, matrix B that is the Hermite normal form of matrix V is generated as a public key matrix. The process in this step may be executed by the public key generator 108 of the key generator 10.

In S110, it is determined whether or not public key matrix B generated by the public key generator 108 takes the form of the above equation 42, where d is component (1,1) and r is component (2,1). When the determination result is "NO", i.e., when public key matrix B takes the form as represented by equation 42, such a matrix is discarded, and the process returns to S104 so as to perform the key generation again. When the determination result is "YES", i.e., when public key matrix B takes the form as represented by equation 42, such a matrix B remains without being discarded. Thereafter, the process proceeds to S112. Components (1,1)d and (2,1)r are both scalar values. Scalar value d, which is component (1,1) of public key matrix B, is also referred to as a public key. The process in this step may be executed by the public key matrix determinator 110 of the key generator 10.

In S112, scalar value w, which is component (1,1) of matrix W defined by equation 43 when components (1,1) and (2,1) of public key matrix B are d and r, respectively, is extracted. Component (1,1) d of public key matrix B is also a matrix equation of matrix B. The process in this step may be executed by the secret key data extractor 112 of the key generator 10.

In S114, it is determined whether or not scalar value w extracted in S112 is a multiple of s. When the determination result is "NO", i.e., when scalar value w is not a multiple of s, such a matrix B remains without being discarded. Thereafter, the process proceeds to S116. Scalar value w is also referred to as a secret key. When the determination result is "YES", i.e., when scalar value w is a multiple of s, such a value w is discarded, and the process returns to S104 so as to perform the key generation again. The process in this step may be executed by the secret key generator 114 of the key generator 10.

In S116, public key d, element (2,1) r of a public key matrix, dimension n, and plain text space size s are output as public key data, and secret key w is output as secret key data.

By employing the above configurations and processing methods, a device and a method that can realize an encryption process and a decryption process that yield high accuracy and high processing speed while using homomorphic encryption in a cryptography process that calculates a concealment distance of two pieces of data while keeping the distance in an encrypted state is provided.

EXAMPLES

By referring to FIG. 3 through FIG. 5, explanations will be given for an example of a cryptography processing device that uses the above ideal lattice-based fully Homomorphic encryption.

The cryptography processing device described below is a device that compares two pieces of data and calculates a concealment distance such as the Hamming distance between the pieces. It is also possible to use one of the two pieces of data as reference data that is registered beforehand and to use the other piece as comparison data that is compared with the reference data so as to confirm whether or not they are similar. In such a case, the cryptography processing device functions as an authorization device or a search device.

In the authorization device or the search device, vector data $A=(a_1, \ldots, a_n)$ and vector data $B=(b_1, \ldots, b_n)$ are compared so as to calculate the concealment distance such as a Hamming distance between the pieces of data. When vector data $A=(a_1, \ldots, a_n)$ is assumed to be reference data that is registered beforehand, it is compared with comparison data $B=(b_1, \ldots, b_n)$ so as to determine that the two pieces of data are identical when the concealment distance between the pieces of data is longer than a prescribed value.

The cryptography processing device explained below calculates the concealment distance between two pieces of data while keeping the distance in an encrypted state.

Figure 3:
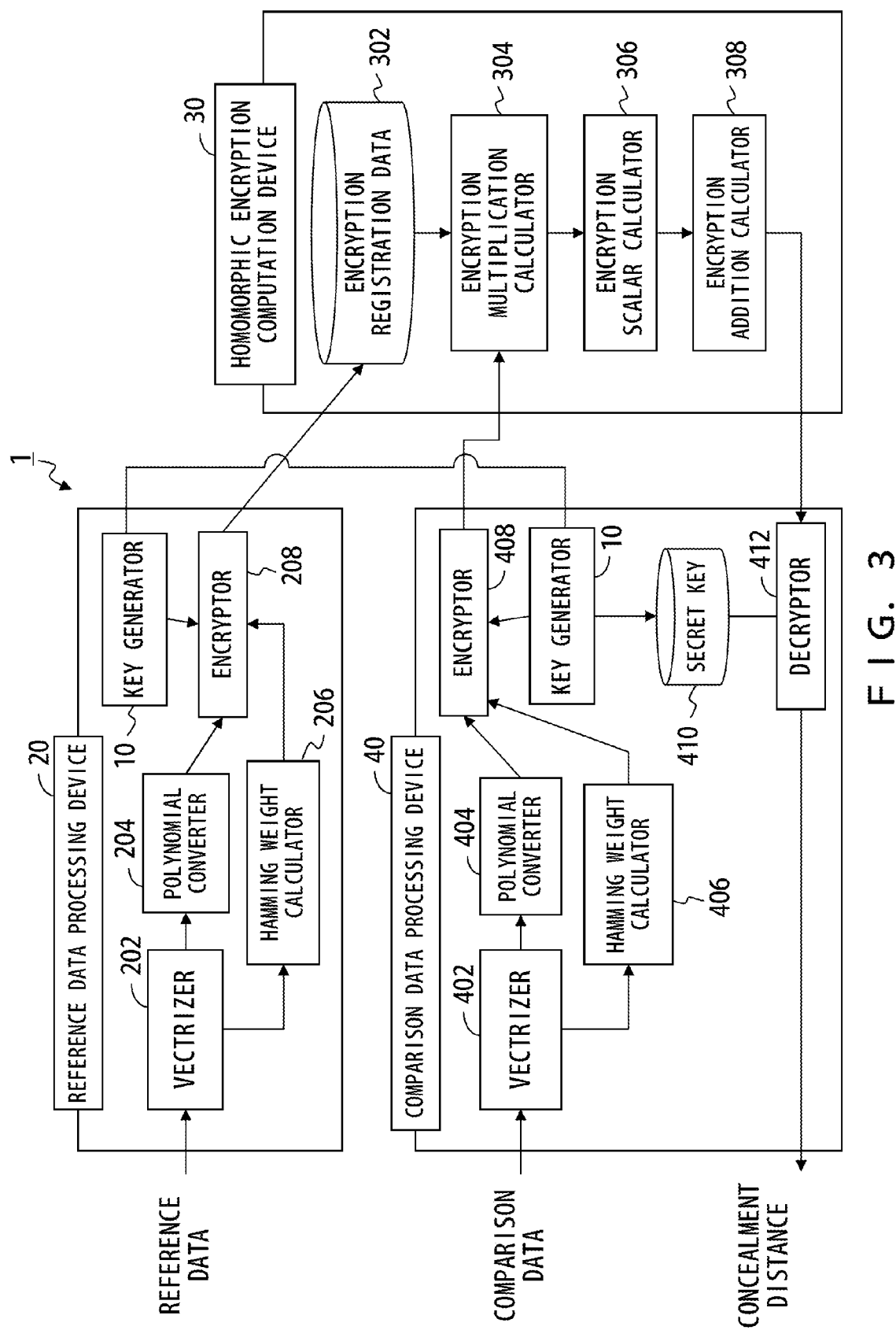
FIG. 3 is a functional block diagram of a homomorphic encryption device that uses a key generation method.
Figure 4:
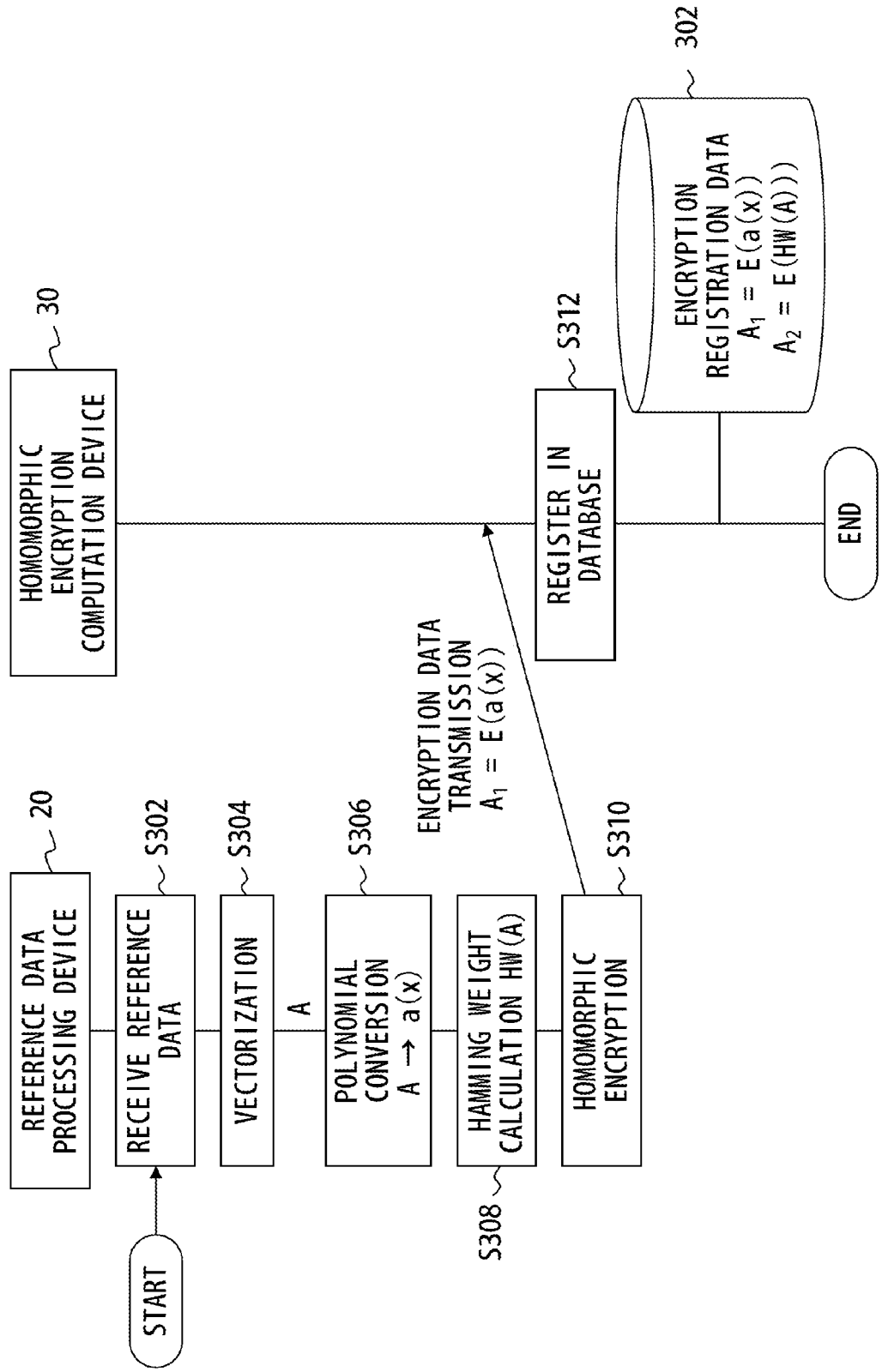
FIG. 4 is a flowchart illustrating an example of a flow of a registration process of reference data, executed in the homomorphic encryption device illustrated in FIG. 3.

As illustrated in FIG. 3, when reference data is stored, the reference data is vectorized and encryption data obtained by concealing obtained data $A=(a_1, \ldots, a_n)$ by using homomorphic encryption is generated in a reference data processing device. Then, only the encryption data is stored in the database of the homomorphic encryption computation device.

Also, for the comparison, the comparison data is vectorized in the comparison data processing device, and only data that is obtained by concealing obtained vector data $B=(b_1, \ldots, b_n)$ by using the homomorphic encryption is transmitted to the homomorphic encryption computation device.

In the homomorphic encryption computation device, the concealment distance between two pieces of data is calculated while keeping the distance of two homomorphically encrypted vectors in an encrypted state, and returns to the comparison data processing device only the calculation result of the concealment distance. As a last step, the comparison data processing device decrypts the concealment distance calculation result by using a secret key, and determines whether or not the two pieces of vector data are similar.

<Configuration of Cryptography Processing Device>

By referring to FIG. 3, detailed explanations will be given for a configuration of a cryptography processing device.

A cryptography processing device 1 includes a reference data processing device 20, a homomorphic encryption computation device 30, and a comparison data processing device 40. The reference data processing device 20 and the comparison data processing device 40 include a key generator 10 illustrated in FIG. 1.

The reference data processing device 20 includes a vectorizer 202, a polynomial convertor 204, a Hamming weight calculator 206, and an encrypter 208. They may be referred to as the first vectorizer 202, the first polynomial converter 204, the first Hamming weight calculator 206, and the first encrypter 208. Also, a first Hamming weight calculator 1106 may be referred to simply as the weight calculator 206.

The homomorphic encryption computation device 30 includes encryption registration data 302 that stores text data as a tag. A cloud 120, although not illustrated in FIG. 6A, includes an encryption multiplication calculator 304 configured to perform addition of two homomorphically encrypted pieces of data, an encryption scalar calculator 306 configured to perform multiplication of homomorphically encrypted data by scalar and an encryption addition calculator 308 configured to perform the addition of two homomorphically encrypted pieces of data.

The encryption multiplication calculator 304, the encryption scalar calculator 306, and the encryption addition calculator 308 are combined to constitute a concealment distance calculator.

In the vectorizer 202, input text data is expressed as n-dimensional vector a. For example, vector a is expressed by the equation below where $a_1, \ldots, a_n$ is 0 or 1.

$$a = (a_1, a_2, \ldots, a_n) \quad (44)$$

The polynomial converter 204 converts vector a obtained in the vectorizer 202 into a polynomial. For example, a conversion polynomial of the equation below is calculated.

$$a(x) = \sum_{i=1}^{n} a_i x^{i-1} \quad (45)$$

As described above, the (first) polynomial converter 206 obtains first polynomial $a(x)$ by using the first conversion polynomial from first vector a.

The Hamming weight calculator 206 calculates Hamming weight $HW(a)$ of vector a. In this case, Hamming weight $HW(a)$ is as expressed by the equation below.

$$HW(a) = \sum_{i=1}^{n} a_i \quad (46)$$

As described above, the (first) Hamming weight calculator 206 calculates first weight $HW(a)$ related to the concealment distance of first vector a. In this case, the concealment distance is a Hamming distance, and the first weight is a Hamming weight.

A homomorphic encrypter 210 uses a public key generated by the key generator 10 so as to encrypt polynomial $a(x)$ obtained by the polynomial converter 204 and Hamming weight $HW(a)$ obtained by the Hamming weight calculator 206, and thereby obtains $Enc(a(x))$ and $Enc(HW(a))$.

$$Enc(a(x)) = \left[ a(r) + s \times \sum_{i=1}^{n} u_i \times r^{i-1} \right]_d \quad (47)$$

$$Enc(HW(a)) = \left[ HW(a(r)) + s \times \sum_{i=1}^{1} u_i \times r^{i-1} \right]_d$$

As described above, the (first) homomorphic encrypter 208 encrypts first polynomial $a(x)$ and first weight $hw(a)$ respectively by using a homomorphic encryption method so as to obtain first encryption polynomial $Enc(a(x))$ and first encryption weight $Enc(HW(a))$.

The cryptography data $Enc(a(x))$ and $Enc(HW(a))$ obtained by the homomorphic encrypter 208 are transmitted to the homomorphic encryption computation device 30 and are stored in the encryption registration data 302.

The comparison data processing device 40 includes a vectorizer 402, a polynomial converter 404, a Hamming weight calculator 406, and an encrypter 408. They have the identical or similar configurations to those of the vectorizer 202, the polynomial converter 204, the Hamming weight calculator 206, and the encrypter 208 of the reference data processing device 20, respectively. Also, the comparison data processing device 40 includes a decrypter 410 and a secret key storage 410 configured to store a secret key based on a public key cryptography method. Also, they may be referred to as a second vectorizer 402, a second polynomial converter 404, a second Hamming weight calculator 406, and a second encrypter 408. Reference may be made without discriminating the first vectorizer 202, the first polynomial convertor 204, the first Hamming weight calculator 206, and the first encrypter 208 from the second vectorizer 402, the second polynomial converter 404, the second Hamming weight calculator 406, and second the encrypter 408. Also, the second Hamming weight calculator 406 may simply be referred to as the weight calculator 406.

In the vectorizer 402, text data input by a user is expressed as n-dimensional vector b. For example, vector b is expressed by equation (48) below where $b_1, \ldots, b_n$ is 0 or 1.

$$b = (b_1, b_2, \ldots, b_n) \quad (48)$$

As described above, the second vectorizer 402 expresses (second) text data input by a user as first vector b.

The polynomial converter 404 converts vector b obtained by the vectorizer 402 into a polynomial.

$$b(x) = \sum_{j=1}^{n} b_j x^{n-j+1} \quad (49)$$

is calculated. Attention has to be paid to the fact that conversion polynomial $b(x)$ when a search is made is different from conversion polynomial $a(x)$ when it is stored. As described above, the (second) Hamming weight calculator 406 obtains second polynomial $b(x)$ by using the second conversion polynomial from second vector b.

The Hamming weight calculator 406 calculates Hamming weight $HW(b)$ of vector b. In this case, Hamming weight $HW(b)$ is as expressed by the equation below.

$$HW(b) = \sum_{i=1}^{n} b_i \quad (50)$$

As described above, the (second) weight calculator 406 calculates second weight $HW(b)$ that is related to the concealment distance of second vector b. In this case, the concealment distance is a Hamming distance, and the second weight is a Hamming weight.

The polynomial obtained by the polynomial converter 404 and the Hamming weight $HW(b)$ obtained by the Hamming weight calculator 406 are encrypted by the homomorphic encrypter 408 by using public key data generated by the key generator 10 so that $Enc(b(x))$ and $Enc(HW(b))$ are obtained. As described above, the (second) homomorphic encrypter 408 encrypts second polynomial $b(x)$ and second weight $HW(b)$ by using a homomorphic encryption method so as to obtain second encryption polynomial $Enc(b(x))$ and second encryption weight $Enc(HW(b))$.

The encryption data $Enc(b(x))$ and $Enc(HW(b))$ obtained by the homomorphic encrypter 408 is transmitted to the homomorphic encryption computation device 30. $Enc(b(x))$ and $Enc(HW(b))$ are results of replacing $a(x)$ with $b(x)$ in equations (46) and (47).

The encryption multiplication calculator 304 of the homomorphic encryption computation device 30 calculates the product of the Enc(a(x)) stored in the encryption registration data 302 and the Enc(b(x)) obtained by the homomorphic encrypter 408, i.e., the equation below.

$$C_1 = Enc(a(x)) \times Enc(b(x)) \tag{51}$$

The encryption scalar calculator 306 calculates the product of two integers:

$$k_1 = \left[-\sum_i r^{n-i}\right]_d \tag{52}$$

$$k_2 = \left[-\sum_j r^j\right]_d$$

and Enc(a(x)) and Enc(b(x)), that is, the equation below.

$$k_1 \times Enc(a(x))$$

$$k_2 \times Enc(b(x)) \tag{53}$$

Also, the encryption scalar calculator 306 calculates the doubling of $C_1$ obtained by the encryption multiplication calculator 304, i.e., the equation below.

$$2 \times C_1 = 2 \times Enc(a(x)) \times Enc(b(x)) \tag{54}$$

The encryption addition calculator 308 calculates the sum of $k_1 \times Enc(HW(a))$, $k_2 \times Enc(HW(b))$ and $2 \times Enc(a(x)) \times Enc(b(x))$ so as to calculate Hamming distance D, which is expressed as a concealment distance by the equation below.

$$D = k_1 \times Enc(a(x)) + k_2 \times Enc(b(x)) + 2 \times Enc(a(x)) \times Enc(b(x)) \tag{55}$$

As described above, the concealment distance calculator obtains encryption concealment distance (Hamming distance) D that corresponds to the encryption of the concealment distance between first vector a and second vector b from first encryption polynomial Enc(a(x)), second encryption polynomial Enc(b(x)), first encryption weight Enc(HW(a)), and a second encryption weight Enc(HW(b)). Then, only Hamming distance D is transmitted to the comparison data processing device 40.

For communications between the homomorphic encryption computation device 30 and the comparison data processing device 40, public key encryption is used so as to secure the concealedness of communication data.

For the key for this communication, matrix V as expressed by equation (56) is generated as a secret key matrix by using n-dimensional key generation vector $v = (v_0, v_1, \ldots, v_{n-1})$ where the absolute value of each component is a random integer equal to or smaller than t bits and components $v_1, \ldots, v_{n-1}$ except for $v_0$ are respective integers that are a multiple of a plain text space size s.

$$V = \begin{bmatrix} v_0 & v_1 & v_2 & \ldots & v_{n-1} \\ -v_{n-1} & v_0 & v_1 & \ldots & v_{n-2} \\ -v_{n-2} & -v_{n-1} & v_0 & \ldots & v_{n-3} \\ \vdots & \vdots & \vdots & \ddots & \vdots \\ -v_1 & -v_2 & -v_3 & \ldots & v_0 \end{bmatrix} \tag{56}$$

Also, it is assumed to be matrix B, which is a Hermite normal form of a secret key matrix V. When a plain text b smaller than plain text space size s is encrypted by using public key B, public key matrix B defined as a Hermite normal form of a secret key matrix V is generated, and in such a case public key matrix B is assumed to have the form expressed by the equation below.

$$B = \begin{bmatrix} d & 0 & 0 & \ldots & 0 \\ r & 1 & 0 & \ldots & 0 \\ * & 0 & 1 & \ldots & 0 \\ \vdots & \vdots & \vdots & \ddots & \vdots \\ * & 0 & 0 & \ldots & 1 \end{bmatrix} \tag{57}$$

Further, when component (1, 1) of public key matrix B is d and component (2, 1) is r, component w(1, 1) of matrix W defined by equation (55) that is not a multiple of s is used as secret key data.

$$W = d \times V^{-1} \tag{58}$$

It is sufficient to hold four elements of (d, r, n, s) as public key data.

Secret key w is stored in the secret key storage 412.

The decrypter 410 uses secret key w so as to decrypt homomorphically encrypted Hamming distance D, which was transmitted from the homomorphic encryption computation device 30. Hamming distance D' obtained by the decryption is calculated by the equation below.

$$D' = [D \times w]_d \bmod s \tag{59}$$

The decrypter 406 calculates concealment distance D' as a degree of similarity by decrypting encryption concealment distance D. Then, Hamming distance D' is output as a degree of similarity.

It is also possible for the decrypter 410 to compare decrypted Hamming distance D' with threshold Dth that is prepared beforehand. When D'<Dth, the reference data and comparison data are determined to be identical.

In the above explanation, equation 55 has been used to express a Hamming distance. However, a Hamming distance may be defined by equation 36 or equation 37 by using b'(x) and $C_2$' of equation 35 instead of b(x) and $C_2$.

<Process of Cryptography Processing Device>

By referring to FIG. 4 and FIG. 5, an example of processes in the cryptography processing device 1 will be explained. FIG. 4 is a flowchart illustrating an example of a flow of a registration process of reference data executed by the cryptography processing device 1 illustrated in FIG. 3.

When the process has started, the reference data processing device 20 receives the input of reference data in step S302. Thereafter, the process proceeds to step S104.

In S304, the reference data input in S302 is expressed as n-dimensional vector a. This process may be executed by the vectorizer 202 of the reference data processing device 20.

In the next step, S306, n-dimensional vector a is converted into a polynomial. This process may be executed by the polynomial converter 204 of the reference data processing device 20.

In the next step, S308, the Hamming weight HW(a) for n-dimensional vector a is calculated. This process is executed by the Hamming weight calculator 206 of the reference data processing device 20.

In the next step, S310, polynomial a(x) obtained in S306 and Hamming weight HW(a) obtained in S108 are encrypted so as to obtain Enc(a(x)) and Enc(HW(a)). Enc(a(x)) and Enc(HW (a)) are transmitted to the homomorphic encryption computation device 30. The process in this step may be executed by the an encrypter 208 of the reference data processing device 20.

In S312, Enc(a(x)) and Enc(HW(a)) are stored in a database such as, for example, the encryption registration data 302 of the homomorphic encryption computation device 30.

Then, the registration process of reference data is terminated.

Figure 5:
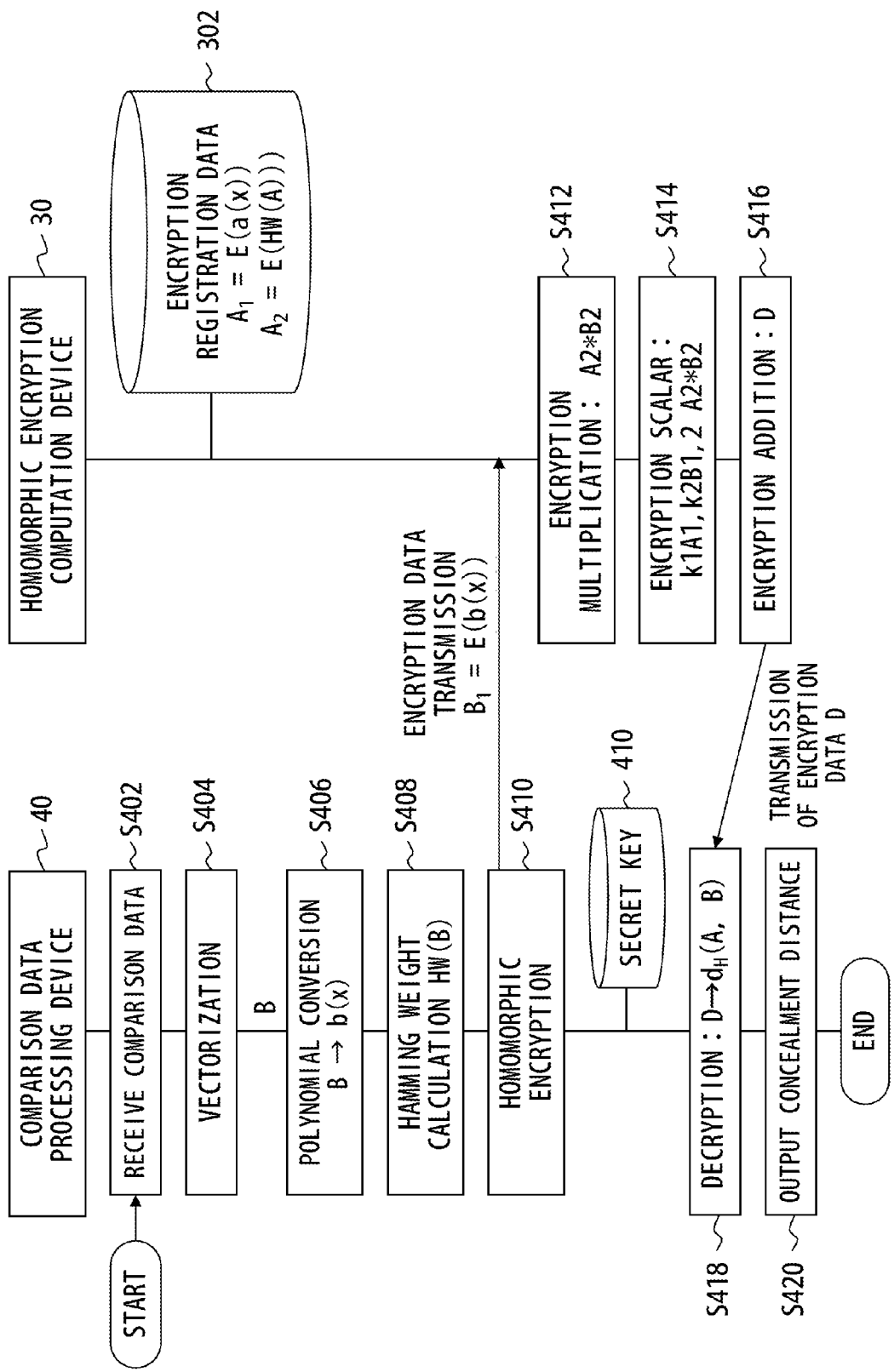
FIG. 5 is a flowchart illustrating an example of a flow of a comparison process between comparison data and reference data, executed by the homomorphic encryption device illustrated in FIG. 3.

FIG. 5 is a flowchart illustrating an example of a flow of a comparison process, executed by the cryptography processing device 1 illustrated in FIG. 3, between comparison data and reference data.

When the process has started, the comparison data processing device 40 receives the input of comparison data in step S402. Then, the process proceeds to S404.

In S404, the comparison data input in S402 is expressed as an n-dimensional vector b. This process may be executed by the vectorizer 402 of the comparison data processing device 40.

In the next S406, n-dimensional vector a is converted into a polynomial. This process may be executed by the polynomial converter 404 of the comparison data processing device 40.

In S408, next to S406, Hamming weight HW(b) for n-dimensional vector a is calculated. This process may be executed by the Hamming weight calculator 406 of the comparison data processing device 40.

In the next step, S410, polynomial b(x) obtained in S406 and Hamming weight HW(b) obtained in S408 are encrypted so as to obtain Enc(b(x)) and Enc(HW(b)). Then, these data of Enc(b(x)) and Enc(HW(b)) are transmitted to the cloud 120. This process may be executed by the encrypter 408 of the homomorphic encryption computation device 30.

In S412, the product of Enc(a(x)) stored in the encryption registration data 302 and Enc(b(x)) obtained in S410, i.e., (b(x))×Enc(HW(b)), is calculated. This process may be executed by the encryption multiplication calculator 304 of the homomorphic encryption computation device 30.

In S414, the product of $k_1$ and Enc(a(x)) and the product of k2 and Enc(b(x)), $k_1$ and $k_2$ being the two integers in equation 53, are calculated; specifically, $k_1$Enc(a(x))) and $k_2$Enc(b(x)) are calculated. Also, in S414, of the doubling of Enc(b(x))× Enc(HW(b)) obtained in S410 i.e., 2Enc(b(x))×Enc(HW(b)) is calculated. The process in this step may be executed by the encryption scalar calculator 306 of the homomorphic encryption computation device 30.

In S416, the sum of $k_1$×Enc(HW(a)), $k_2$×Enc(HW(b)), and 2×Enc(a(x)))×Enc(b(x)) is calculated so as to obtain Hamming distance D expressed by equation 60 as a concealment distance. Only Hamming distance D is transmitted to the comparison data processing device 40. The process of this step may be executed by the encryption addition calculator 308 of the homomorphic encryption computation device 30.

In the next step, S418, secret key w is used so as to decrypt homomorphically encrypted Hamming distance D that was transmitted from the homomorphic encryption computation device 30. Secret key w may be generated by the key generator 10 of the comparison data processing device 40 so as to be stored in the encryption registration data 412 of the comparison data processing device 40. The process of this step may be executed by the decrypter 410 of the comparison data processing device 40.

In S420, the result obtained in S418 is output as a concealment distance. This process is executed by a display device (not illustrated).

Then, the checking process is terminated.

In the above, an expression such as equation 55 has been used as a Hamming distance. However, it is easy to use b'(x), $C_2'$ such as those in equation 35 instead of b(x), $C_2$ so as to change the above process to a process that uses the definition of equation 36 or equation 37 as a Hamming distance.

Figure 6:
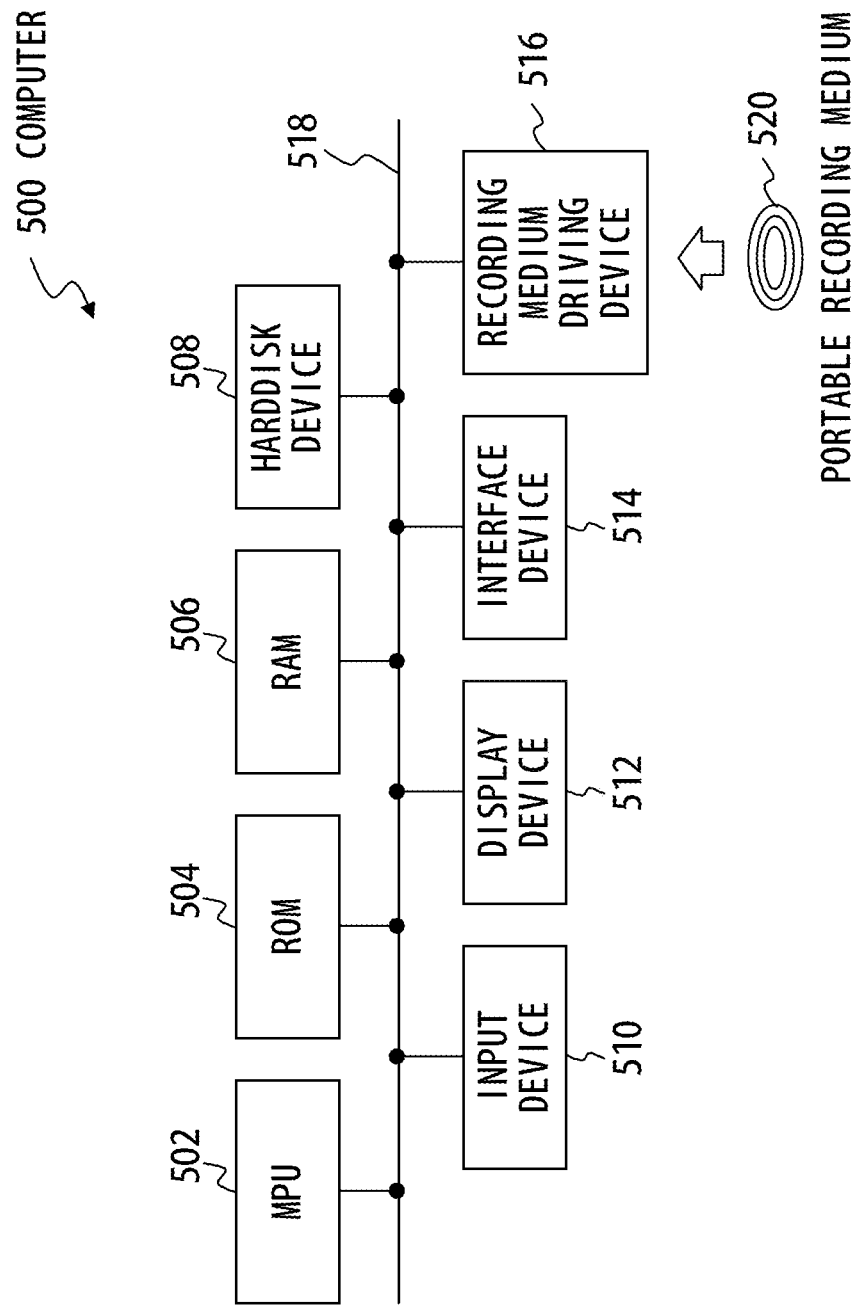
FIG. 6 illustrates a configuration of the key generator illustrated in FIG. 1 or the encryption device illustrated in FIG. 5.

FIG. 6 illustrates a configuration example of a cryptography processing device that utilizes homomorphic encryption. FIG. 6 illustrates a configuration example of a computer that can be used as a homomorphic encryption device.

A computer 500 illustrated in the figure includes an MPU 502, a ROM 504, a RAM 506, a harddisk device 508, an input device 510, a display device 512, an interface device 514, and a recording medium driving device 516. Also, these constituents are connected to each other via a bus line 518, and can transmit and receive various types of data to and from each other under control of the MPU 502.

The Micro Processing Unit (MPU) 502 is a computation process unit that controls the entire operation of the computer 500, and functions as a control process unit of the computer 500.

The Read Only Memory (ROM) 504 is a read-only semiconductor memory that records a prescribed basic control program beforehand. The MPU 502 can control operations of the respective constituents of the computer 500 by reading and executing this basic control program when the computer 500 is activated.

The Random Access Memory (RAM) 506 is a semiconductor memory that is used as an operation storage area on an as-needed basis when the MPU 502 executes various control programs and that can read and write information at any given time.

The harddisk device 508 is a storage device that stores various types of control programs executed by the MPU 502 and various types of data. The MPU 502 reads and executes a prescribed program stored in the harddisk device 508, and thereby can perform various control processes, which will be described later.

The input device 510 is, for example, a mouse or a keyboard, and when it is manipulated by a user of the system illustrated in FIG. 6, it obtains the input of various pieces of information that were made to correspond to that manipulation, and transmits the obtained input information to the MPU 502.

The display device 512 is, for example, a liquid crystal display device, and displays various texts and images in accordance with display data transmitted from the MPU 502.

The interface device 514 manages transmission and reception of various types of information between various devices connected to the computer 500.

The recording medium driving device 516 is a device that reads various control programs and data stored in a portable recording medium 518. The MPU 501 can also perform various processes, which will be described later, by reading and executing a prescribed control program recorded in the portable recording medium 520 via the recording medium driving device 516. Also, as examples of the portable recording medium 218, there is a flash memory equipped with a connector based on the standard of a Universal Serial Bus (USB), a Compact Disc Read Only Memory (CD-ROM), a Digital Versatile Disc Read Only Memory (DVD-ROM), and the like.

In order to configure a cryptography processing device by using the computer 500, a control program for making the MPU 502 execute processes in the above respective process units is for example generated. The generated control program is stored beforehand in the harddisk device 508 or the portable recording medium 520. The MPU 502 is given a prescribed instruction so that it reads and executes this control program. Thereby, a function that the cryptography processing device is provided with is provided by the MPU 502.

According to the cryptography processing device and the cryptography processing method according to the embodiments, it is possible to realize an encryption process and a decryption process that yield a high accuracy and high processing speed while using homomorphic encryption in a cryptography process that calculates a concealment distance of two pieces of data while keeping the distance in an encrypted state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cryptography processing device, comprising:
   an input device configured to obtain from an external environment an input of a dimension of a key generation vector, in which each element is equal to or smaller than a maximum bit length and elements except for a first element are integers that are multiples of a plain text space size, an input of the maximum bit length and an input of the plain text space size, the plain text space size being a number of types of symbols that a plain text to be encrypted may take; and
   a processor configured to
      generate the key generation vector using the dimension, the maximum bit length and the plain text space size,
      generate a secret key matrix from the key generation vector,
      generate a public key matrix from the secret key matrix,
      generate public key data including a first public key matrix element, which is a discriminant of the public key matrix, a second public key matrix element, which is an integer, the dimension, and the plain text space size,
      generate secret key data that includes, as a secret key, an integer that is an element of a matrix obtained as a product of the first public key matrix element and an inverse matrix of the secret key matrix and that is not a multiple of the plain text space size,
      encrypt the plain text using the public key data so as to obtain cryptography data, and
      output the obtained cryptography data.

2. The cryptography processing device according to claim 1, wherein:
   when the key generation vector is written as $v=(v_0, v_1, \ldots, v_{n-1})$, the secret key matrix is $$\begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix}.$$

3. The cryptography processing device according to claim 1, wherein:
   the public key matrix is a Hermite normal form of the secret key matrix.

4. The cryptography processing device according to claim 1, wherein:
   the prescribed condition to be satisfied by the public key matrix is that the public key matrix is in a form of $$\begin{bmatrix} d & 0 & 0 & \cdots & 0 \\ r & 1 & 0 & \cdots & 0 \\ * & 0 & 1 & \cdots & 0 \\ \vdots & \vdots & \vdots & \ddots & \vdots \\ * & 0 & 0 & \cdots & 1 \end{bmatrix},$$

where d and r are integers.

5. The cryptography processing device according to claim 1, wherein
   the processor is further configured to
      obtain a first polynomial from a first vector by using a first conversion polynomial,
      obtain a second polynomial from a second vector by using a second conversion polynomial,
      obtain a first weight related to a concealment distance of the first vector and a second weight related to a concealment distance of the second vector,
      obtain a first encryption polynomial, a second encryption polynomial, a first encryption weight, and a second encryption weight by encrypting each of the first polynomial, the second polynomial, the first weight, and the second weight by using the public key data,
      obtain an encryption concealment distance that corresponds to encryption of a concealment distance of the first vector and the second vector from the first encryption polynomial, the second encryption polynomial, the first encryption weight, and the second encryption weight, and
      decrypt the encryption concealment distance by using the secret key data.

6. The cryptography processing device according to claim 5, wherein:
   the weight is a Hamming weight and the concealment distance is a Hamming distance.

7. A cryptography processing method comprising:
   obtaining, by using an input device, from an external environment an input of a dimension of a key generation vector, in which each element is equal to or smaller than a maximum bit length and elements except for a first element are integers that are multiples of a plain text space size, an input of the maximum bit length and an input of the plain text space size, the plain text space size being a number of types of symbols that a plain text to be encrypted may take;
   generating the key generation vector using the dimension, the maximum bit length and the plain text space size by using a processor;
   generating a secret key matrix from the key generation vector by using the processor;
   generating a public key matrix from the secret key matrix;
   generating public key data including a first public key matrix element, which is a discriminant of the public key matrix, a second public key matrix element, which is an integer, the dimension, and the plain text space size by using the processor; and
   generating secret key data that includes, as a secret key, an integer that is an element of a matrix obtained as a product of the first public key matrix element and an inverse matrix of the secret key matrix and that is not a multiple of the plain text space size by using the processor;
   encrypting, by using the processor, the plain text using the public key data so as to obtain cryptography data; and outputting, by using the processor, the obtained cryptography data.

8. The cryptography processing method according to claim 7, wherein:

when the key generation vector is written as $v=(v_0, v_1, \ldots, v_{n-1})$, the secret key matrix is $$\begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix}.$$

9. The cryptography processing method according to claim 7, wherein:

the public key matrix is a Hermite normal form of the secret key matrix.

10. The cryptography processing method according to claim 7, wherein:

the prescribed condition to be satisfied by the public key matrix is that the public key matrix is in a form of $$\begin{bmatrix} d & 0 & 0 & \cdots & 0 \\ r & 1 & 0 & \cdots & 0 \\ * & 0 & 1 & \cdots & 0 \\ \vdots & \vdots & \vdots & \ddots & \vdots \\ * & 0 & 0 & \cdots & 1 \end{bmatrix},$$

where d and r are integers.

11. The cryptography processing method according to claim 7, the method further comprising:

obtaining a first polynomial from a first vector by using a first conversion polynomial;

obtaining a second polynomial from a second vector by using a second conversion polynomial by using the processor;

obtaining a first weight related to a concealment distance of the first vector and a second weight related to a concealment distance of the second vector by using the processor;

obtaining a first encryption polynomial, a second encryption polynomial, a first encryption weight, and a second encryption weight by encrypting each of the first polynomial, the second polynomial, the first weight, and the second weight by using the public key data by using the processor;

obtaining an encryption concealment distance that corresponds to encryption of a concealment distance of the first vector and the second vector from the first encryption polynomial, the second encryption polynomial, the first encryption weight, and the second encryption weight by using the processor; and decrypting the encryption concealment distance by using the secret key data by using the processor.

12. The cryptography processing method according to claim 11, wherein:

the weight is a Hamming weight and the concealment distance is a Hamming distance.

* * * * *